United States Patent
Tseng

(10) Patent No.: US 8,941,614 B2
(45) Date of Patent: Jan. 27, 2015

(54) PORTABLE ELECTRONIC APPARATUS AND KEY PAD THEREOF

(75) Inventor: Tien-Chung Tseng, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 377 days.

(21) Appl. No.: 13/603,442

(22) Filed: Sep. 5, 2012

(65) Prior Publication Data

US 2013/0335364 A1    Dec. 19, 2013

(30) Foreign Application Priority Data

Jun. 18, 2012  (TW) .............................. 101121718 A

(51) Int. Cl.
*G06F 3/044*  (2006.01)

(52) U.S. Cl.
USPC .......................................... 345/174; 345/173

(58) Field of Classification Search
USPC ............... 345/156, 168, 173, 174; 341/22, 23
See application file for complete search history.

(56) References Cited

U.S. PATENT DOCUMENTS

| | | | |
|---|---|---|---|
| 6,492,978 B1 * | 12/2002 | Selig et al. ..................... | 345/173 |
| 6,585,435 B2 * | 7/2003 | Fang .............................. | 400/479 |
| 6,776,546 B2 * | 8/2004 | Kraus et al. .................... | 400/472 |
| 8,790,025 B2 * | 7/2014 | Isaac et al. ..................... | 400/491 |
| 8,862,988 B2 * | 10/2014 | Baker et al. .................... | 715/262 |
| 2009/0109068 A1 * | 4/2009 | Yeh et al. ........................ | 341/34 |
| 2010/0079403 A1 * | 4/2010 | Lynch et al. ................... | 345/174 |
| 2010/0253634 A1 * | 10/2010 | Lin et al. ....................... | 345/170 |
| 2010/0302168 A1 * | 12/2010 | Giancarlo et al. ............ | 345/169 |
| 2010/0321298 A1 | 12/2010 | Tsai | |
| 2011/0260976 A1 * | 10/2011 | Larsen et al. ................. | 345/168 |
| 2012/0086642 A1 * | 4/2012 | Weihe .......................... | 345/168 |
| 2012/0092259 A1 * | 4/2012 | Liu et al. ...................... | 345/168 |

* cited by examiner

*Primary Examiner* — Joe H Cheng
(74) *Attorney, Agent, or Firm* — Winston Hsu; Scott Margo

(57) ABSTRACT

A portable electronic apparatus and a key pad thereof are disclosed. The portable electronic apparatus includes a processing module, a panel, and a key pad. The processing module provides a virtual keyboard interface on a capacitive touch surface of the panel. The key pad is placed on the capacitive touch surface in a detachable way and corresponds to the virtual keyboard interface. The key pad includes a plurality of conductive keycaps and a plurality of conductive contact part correspondingly connected to the conductive keycaps. A user can press the conductive keycaps by fingers to make the corresponding conductive contact part touch the virtual keyboard interface, so as to achieve a touch input. Therefore, the invention can provide the user the feeling of pressing keys by use of the key pad when the user is using the virtual keyboard interface, which satisfies the use habit of the user.

18 Claims, 4 Drawing Sheets

PORTABLE ELECTRONIC APPARATUS AND KEY PAD THEREOF

BACKGROUND OF THE INVENTION

1. Field of the Invention

The invention relates to a portable electronic apparatus, and especially relates to a detachable key pad, used for a portable electronic apparatus, and a portable electronic apparatus with the key pad.

2. Description of the Prior Art

Products with touch screen such as tablet computers and smart phones are more and more popular on the market. If a user needs to input words by a keyboard, the tablet computer or smart phone will display a virtual keyboard on the touch screen thereof for the user to touch for input. Because the user simulates pressing keys only by touching the screen by fingers, whether the keys of the virtual keyboard are triggered effectively is a doubt, especially for a case that the tablet computer or smart phone does not response to the touching by the user in time, which easily makes the user in confusion in use. Based on user's experience, users usually prefer inputting by a real keyboard if a long-time keying-in is required. Therefore, special external keyboards, capable of providing users an operation environment of physical keys, are available on the market. However, most current external keyboards are designed with rigid structure. Besides, the external keyboard is equipped with electronic components, which are required for connecting with the table computer or smart phone, so that it is hard to reduce the volume of the external keyboard. Both bring inconvenience in storage to users.

SUMMARY OF THE INVENTION

An objective of the invention is to provide a detachable key pad, used for portable electronic apparatus, and a portable electronic apparatus with the key pad. The key pad can provide a feeling of pressing keys for a user when the user is using the virtual keyboard interface provided by the portable electronic apparatus, which satisfies the use habit of the user. Furthermore, the key pad is designed to be flexible, which is conducive to storage.

The keypad of the invention is used for a portable electronic apparatus. The portable electronic apparatus includes a panel. The panel has a capacitive touch surface. The portable electronic apparatus provides a virtual keyboard interface on the capacitive touch surface. The virtual keyboard interface has a plurality of touch positions. The key pad is capable of being placed on the capacitive touch surface corresponding to the virtual keyboard interface. The keypad includes a flexible insulation pad, a plurality of conductive keycaps, and a plurality of conductive contact parts. The flexible insulation pad is disposed on the capacitive touch surface in a detachable way. The flexible insulation pad has a plurality of through holes. Each through hole corresponds to one of the touch positions. The conductive keycaps are disposed above the flexible insulation pad. Each conductive keycap corresponds to one of the through holes. Each conductive contact part is connected to one of the conductive keycaps. Each conductive contact part and the capacitive touch surface form a gap therebetween. Therein, each conductive keycap is capable of being pressed such that the corresponding conductive contact part contacts the corresponding touch position through the corresponding through hole. Thereby, a user can press the conductive keycaps by fingers such that the corresponding conductive contact parts contact the virtual keyboard interface, so as to perform touch input.

The portable electronic apparatus of the invention includes a processing module, a panel, and a key pad. The panel is electrically connected to the processing module and has a capacitive touch surface. The processing module provides a virtual keyboard interface on the capacitive touch surface by the panel. The virtual keyboard interface has a plurality of touch positions. The key pad includes a flexible insulation pad, a plurality of conductive keycaps, and a plurality of conductive contact parts. The flexible insulation pad is disposed on the capacitive touch surface in a detachable way. The flexible insulation pad has a plurality of through holes. Each through hole corresponds to one of the touch positions. The conductive keycaps are disposed above the flexible insulation pad. Each conductive keycap corresponds to one of the through holes. Each conductive contact part is connected to one of the conductive keycaps. Each conductive contact part and the capacitive touch surface form a gap therebetween. Therein, each conductive keycap is capable of being pressed such that the corresponding conductive contact part contacts the corresponding touch position through the corresponding through hole. Similarly, a user can press the conductive keycaps by fingers such that the corresponding conductive contact parts contact the virtual keyboard interface, so as to perform touch input.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
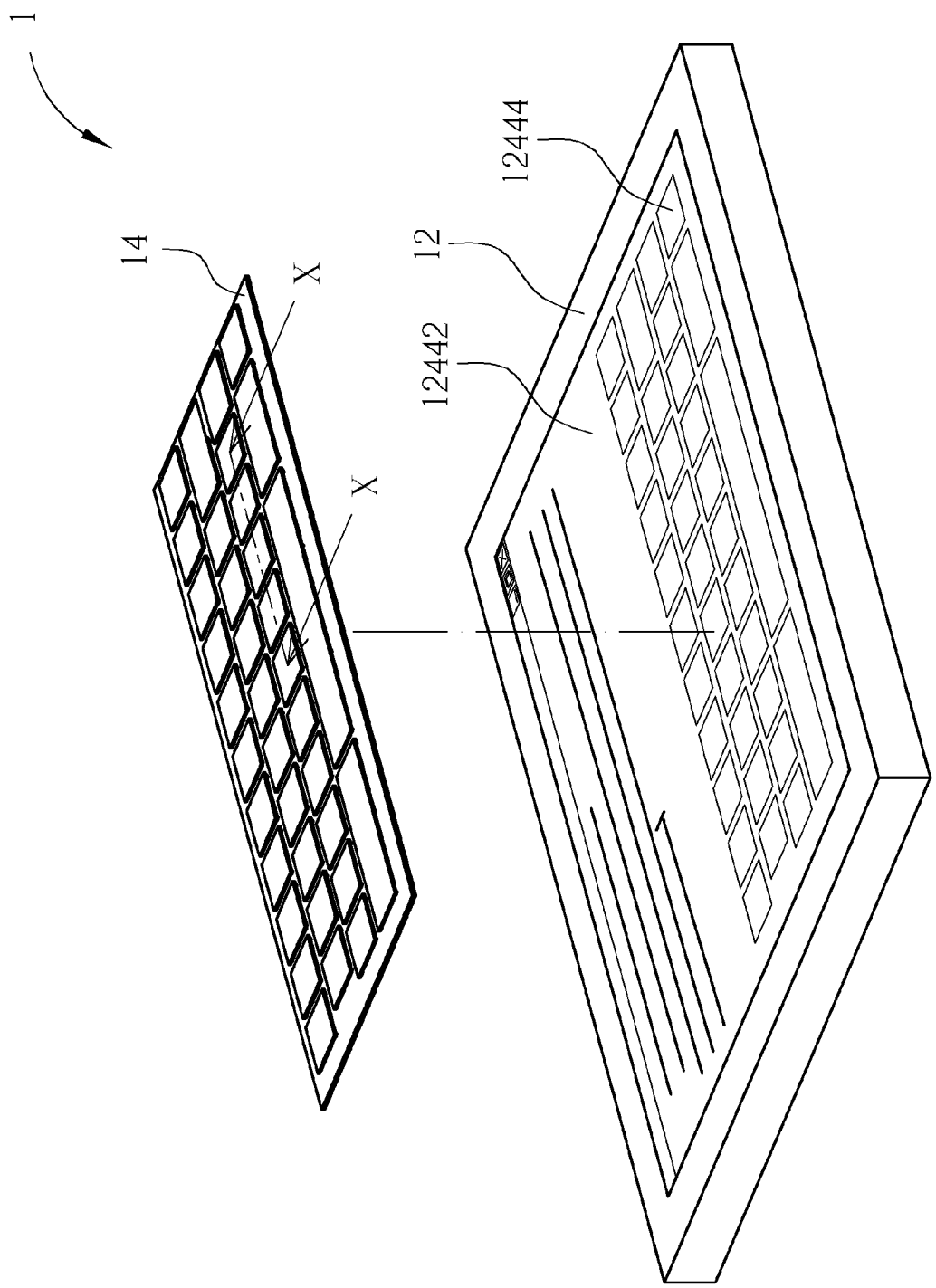
FIG. 1 is a schematic diagram illustrating a portable electronic apparatus of a preferred embodiment according to the invention.
Figure 2:
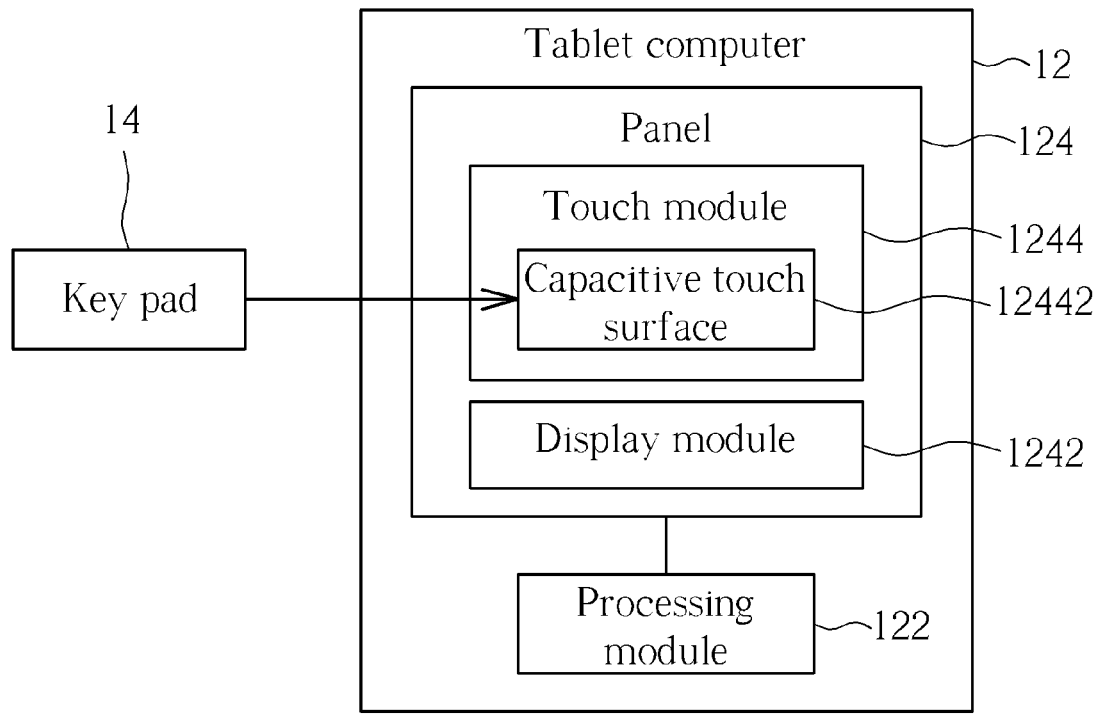
FIG. 2 is a function block diagram of the portable electronic apparatus in FIG. 1.

Please refer to FIG. 1 and FIG. 2. FIG. 1 is a schematic diagram illustrating a portable electronic apparatus 1 of a preferred embodiment according to the invention. FIG. 2 is a function block diagram of the portable electronic apparatus 1. In the embodiment, the portable electronic apparatus 1 includes a tablet computer 12 and a key pad 14. The tablet computer 12 includes a processing module 122, a panel 124, and other required electronic components (not shown in the figures). The panel 124 is a touch display panel. The panel 124 is electrically connected to the processing module 122. The panel 124 includes a display module 1242 and a touch module 1244. Thereby, the processing module 122 can perform displaying, touch controlling and so on by the panel 124. In practice, the displaying and touch controlling of the touch display panel are performed on the same physical surface of the panel 124. In the embodiment, the touch module 1244 has a capacitive touch surface 12442, i.e. the visible displaying area of the tablet computer 12 in FIG. 1. The processing module 122 can provide a virtual keyboard interface 12444 on the capacitive touch surface 12442 by the touch module 1244; simultaneously, the processing module 122 can display a keyboard image relative to the virtual keyboard interface 12444 by the display module 1242 for providing visual identification to users. The virtual keyboard interface 12444 has a plurality of touch positions, i.e. positions for virtual keys. It is added that, in operation, an input manipulation through the virtual keyboard interface 12444 by the user is processed mainly by the touch module 1244, so it is unnecessary to display the keyboard image for the virtual keyboard interface 12444 in practice. However, displaying of the keyboard image and images of interactive keys responding to touch by the user is conducive to friendliness of using the virtual keyboard interface 12444.

Figure 3:
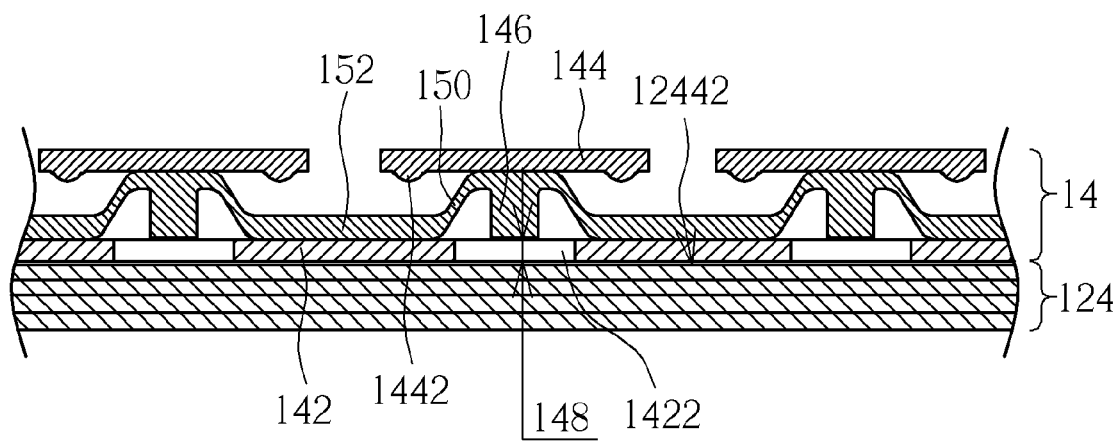
FIG. 3 is a sectional view of a key pad of the portable electronic apparatus in FIG. 1 with being placed on a tablet computer of the portable electronic apparatus.
Figure 4:
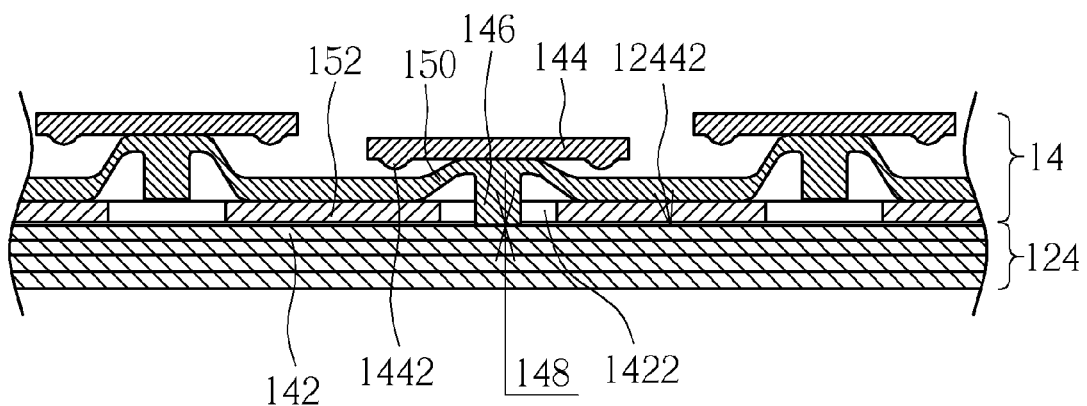
FIG. 4 is a sectional view of the key pad in FIG. 3 with being pressed down.

Please refer to FIG. 3 and FIG. 4. FIG. 3 is a sectional view of the key pad 14 with being placed on the capacitive touch surface 12442 corresponding to the virtual keyboard interface 12444 along the line X-X in FIG. 1. FIG. 4 is a sectional view of the key pad 14 in FIG. 3 with being pressed down. The key pad 14 includes a flexible insulation pad 142, a plurality of conductive keycaps 144, and a plurality of conductive contact parts 146. The flexible insulation pad 142 is disposed on the capacitive touch surface 12442. The flexible insulation pad 142 has a plurality of through holes 1422. Each through hole 1422 corresponds to one of the touch positions. The conductive keycaps 144 are disposed above the flexible insulation pad 142. Each conductive keycap 144 corresponds one of the through holes 1422. Each conductive contact part 146 is connected to one of the conductive keycaps 144. Each conductive contact part 146 and the capacitive touch surface 12442 form a gap 148 therebetween. The gap 148 is usually larger than the thickness of the flexible insulation pad 142, so that the key pad 14 can provide feeling of pressing stroke to users. In use, each conductive keycap 144 is capable of being pressed such that the corresponding conductive contact part 146 contacts the corresponding touch position on the capacitive touch surface 12442 through the corresponding through hole 1422; at this moment, the gap 148 is reduced to zero.

Furthermore, in the embodiment, the key pad 14 also includes a plurality of elastic members 150 disposed on the flexible insulation pad 142. Each elastic member 150 corresponds to one of the through holes 1422. Each conductive keycap 144 is disposed on the corresponding elastic member 150. Each conductive keycap 144 is capable of being pressed such that the corresponding elastic member 150 deforms elastically. The elastic deformation produces restoring force to restore the conductive keycap 144 back to its original position after the external pressing force disappears. Based on the action principle of the elastic member 150, it is unnecessary that the elastic member 150 and the conductive contact part 146 are related in structure. However, if the elastic member 150 is conductive, the elastic member 150 and the corresponding conductive contact part 146 can be formed in one piece of conductive material (such as conductive rubber), which can simplify the production and improve the product reliability. In such case, each conductive contact part 146 can be regarded in structure to be connected to the corresponding conductive keycap 144 through the corresponding elastic member 150. Further, as shown by the embodiment, the keypad 14 includes a conductive rubber pad 152 disposed on the flexible insulation pad 142. The conductive rubber pad 152, the elastic member 150, and the conductive contact part 146 are formed in one piece, which can further simplify the production, reduce the amount of components, and improve the product reliability. It is added that the elastic members 150 not only perform restore function on the conductive keycaps 144 but also provide force feedback to users for enhancing the pressing feeling. In addition, each conductive keycap 144 includes a plurality of protrusions 1442 protruding toward the flexible insulation pad 142. When the conductive keycap 144 is pressed, the protrusions 1442 are conducive to avoidance of an excessive tilt of the conductive keycap 144.

It is added that based on different capacitive touch principles, when the conductive contact part 146 contacts the capacitive touch surface 12442, some charges maybe conducted from the capacitive touch surface 12442 through the conductive contact part 146 to the conductive rubber pad 152 and also conducted to the finger of the user through the corresponding conductive keycap 144, or the finger of the user changes a local charge distribution of the capacitive touch surface 12442 through the corresponding conductive keycap 144 and the conductive contact part 146. The two capacitive touch technologies can induce detection by the touch module 1244. However, the invention is not limited to the both capacitive touch technologies.

Figure 5:
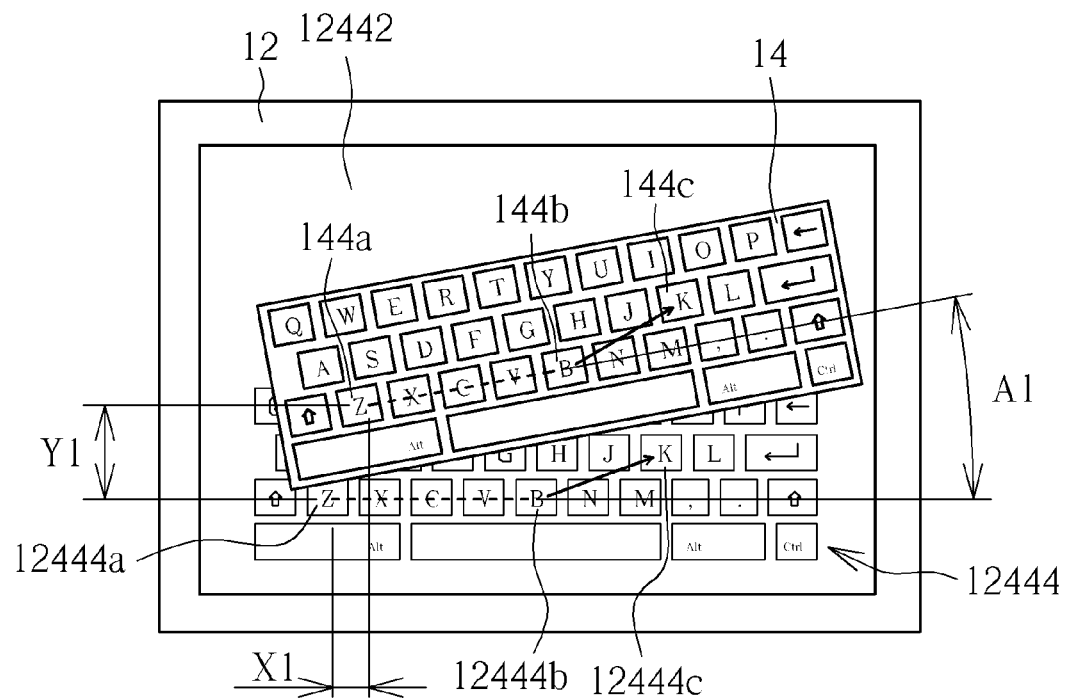
FIG. 5 is a schematic diagram illustrating a position adjustment of a virtual keyboard interface in accordance with the key pad according another embodiment.

In the embodiment, after the processing module 122 provides the virtual keyboard interface 12444, the user needs to align the key pad 14 with the virtual keyboard interface 12444 to be place on the capacitive touch surface 12442, so that the user can trigger the virtual keyboard interface 12444 correctly by use of the conductive keycaps 144; however, the invention is not limited thereto. In practice, the processing module 122 can determine the relative position of the key pad 14 on the capacitive touch surface 12442 and according to the relative position, provide the virtual keyboard interface 12444 directly or adjust the position of the virtual keyboard interface 12444 which has been presented. Please refer to FIG. 5, which is a schematic diagram illustrating a position adjustment of the virtual keyboard interface 12444 in accordance with the disposition of the key pad 14 according another embodiment. The touch positions of the virtual keyboard interface 12444 includes a first touch position 12444a (e.g. the position of key 'Z'), a second touch position 12444b (e.g. the position of key 'B'), and a third touch position 12444c (e.g. the position of key 'K'), which are noncollinear. The conductive keycaps 144 of the key pad 14 includes a first conductive keycap 144a (e.g. the keycap of key 'Z'), a second conductive keycap 144b (e.g. the keycap of key 'B'), and a third conductive keycap 144c (e.g. the keycap of key 'K') correspondingly. As shown by FIG. 5, the virtual keyboard interface 12444 has been provided on the capacitive touch surface 12442 by a predetermined position. A line (shown by a dashed line in the figure) connecting the positions of the first touch position 12444a and the second touch position 12444b is taken as a reference line. The direction from the second touch position 12444b to the third touch position 12444c is taken as a keyboard orientation. After the key pad 14 is placed, the processing module 122, according to touches on the capacitive touch surface 12442 corresponding to the first conductive keycap 144a, the second conductive keycap 144b, and the third conductive keycap 144c by the panel 124, correspondingly determines a first reference position (i.e. the location of the first conductive keycap 144a in FIG. 5), a second reference position (i.e. the location of the second conductive keycap 144b in FIG. 5), and a third reference position (i.e. the location of the second conductive keycap 144c in FIG. 5). Similarly, the processing module 122 can determine the reference line (i.e. the dashed line connecting the first conductive keycap 144a and the second conductive keycap 144b) and the keyboard orientation (i.e. the direction from the second conductive keycap 144b to the third conductive keycap 144c) of the key pad 14 according to the three reference positions, so as to determine a horizontal offset X1, a vertical offset Y1, and a rotation angle A1 of the key pad 14 relative to the virtual keyboard interface 12444. Afterward, the processing module 122 can re-provide the virtual keyboard interface 12444 on the capacitive touch surface 12442 according to the horizontal offset X1, the vertical offset Y1, and the rotation angle A1, such that after the above adjustment, the first touch position 12444a, the second touch position 12444b, and the third touch position 12444c can correspond to the first reference position, the second reference position, and the third reference position respectively, i.e. the first conductive keycap 144a, the second conductive keycap 144b, and the third conductive keycap 144c respectively. Therefore, the user can perform keying input exactly even with any arbitrary placement of the key pad 14 on the capacitive touch surface 12442.

It is added that, in practice, the press operation for locating the key pad 14 may not executed in order. Therefore, in practice, it is sufficient for the determination of the first reference position, the second reference position, and the third reference position corresponding to the first touch position 12444a, the second touch position 12444b, and the third touch position 12444c respectively that the first touch position 12444a, the second touch position 12444b, and the third touch position 12444c just need to form a scalene triangle. Furthermore, the above embodiment is merely based on one of algorithms for adjusting the virtual keyboard interface 12444. In principle, it can perform the function of the invention for adjusting the virtual keyboard interface 12444 that the processing module 122 generates the virtual keyboard interface 12444 by comparing the first touch position 12444a, the second touch position 12444b, and the third touch position 12444c with the first reference position, the second reference position, and the third reference position, such that at this moment, the first touch position 12444a, the second touch position 12444b, the third touch position 12444c correspond to the first reference position, the second reference position, and the third reference position respectively. In addition, the above embodiment is based on the fact that the virtual keyboard interface 12444 has been provided in advance, but the invention is not limited thereto. In practice, it is unnecessary to provide the virtual keyboard interface 12444 on the capacitive touch surface 12442 in advance, but the first touch position 12444a, the second touch position 12444b, and the third touch position 12444c are required to be defined on the capacitive touch surface 12442 in advance. So, the processing module 122 can generate the virtual keyboard interface 12444 on the capacitive touch surface 12442 exactly by the differences between the first touch position 12444a, the second touch position 12444b, and the third touch position 12444c and the first reference position, the second reference position, and the third reference position.

Figure 6:
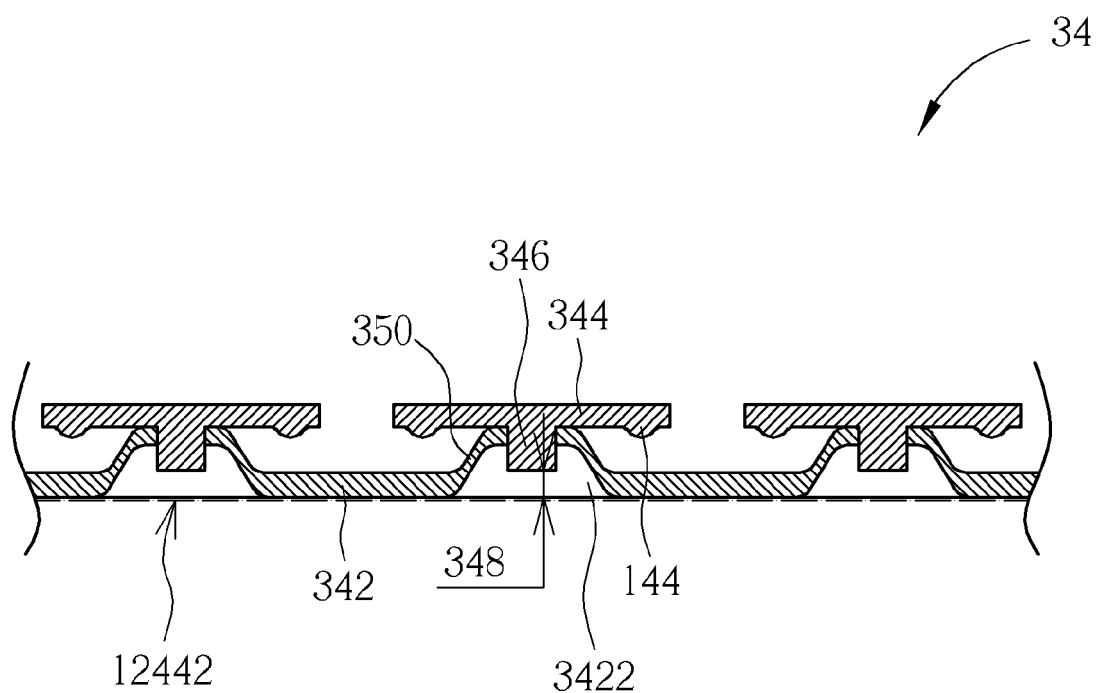
FIG. 6 is a sectional view of the keypad according to another embodiment.

It is added more that in the above embodiment, the key pad 14 is designed to be a two-layer structure (i.e. the flexible insulation pad 142 plus the conductive rubber pad 152) with the conductive keycaps 144 thereon, but the invention is not limited thereto. Please refer to FIG. 6, which is a sectional view of the key pad 34 according to another embodiment. In the embodiment, the key pad 34 and the key pad 14 are similar in structure logic. The main difference therebetween is that the flexible insulation pad 342 and the elastic members 350 of the key pad 34 are formed in one piece, for example made of non-conductive elastic rubber; therein, the conductive contact part 346 of the key pad 34 and the corresponding conductive keycap 344 are formed in one piece, for example made of stiffer conductive rubber or conductive engineering plastic. In structure, the elastic members 350 can be regarded as protrusion portions of the flexible insulation pad 342 with through holes 3422 formed therein for the conductive contact parts 346 passing through. Each conductive contact part 346 and the capacitive touch surface 12442 (indicated by a chain line in FIG. 6) form a gap 348 therebetween, which provides feeling of pressing stroke to users. Compared to the key pad 14 in structure, the amount of the components of the key pad 34 is much less, which is more conducive to the enhancement of the production and product reliability.

In addition, in the above embodiment, the portable electronic apparatus 1 uses the tablet computer 12, but the invention is not limited thereto. In practice, the portable electronic apparatus of the invention can use other tablet electronic device having touch display function. Even the portable electronic apparatus of the invention only provides input function, i.e. only with a touch panel, not a touch display panel; it also can perform the function of the invention.

Compared with the prior art, the key pad of the invention is designed to be flexible in structure so as to be conducive to storage, which solves the problems in the prior art of the special external keyboard having a stiffer and complex structure with a lot of internal electronic components and of uneasy storage therefore due to the difficulty in volume reduction. Furthermore, the key pad of the invention can provide the user the feeling of pressing keys when the user is using the virtual keyboard interface provided by the portable electronic apparatus, which satisfies the use habit of the user. In addition, in practice, if the key pad is not equipped with other electronic components, it is unnecessary for the storage and maintenance of the key pad to consider electrical issues such as short.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic apparatus, comprising:
   a processing module;
   a panel electrically connected to the processing module and having a capacitive touch surface, the processing module providing a virtual keyboard interface on the capacitive touch surface by the panel, the virtual keyboard interface having a plurality of touch positions; and
   a keypad placed on the capacitive touch surface corresponding to the virtual keyboard interface, the key pad comprising:
      a flexible insulation pad disposed on the capacitive touch surface, the flexible insulation pad having a plurality of through holes, each through hole corresponding to one of the touch positions;
      a plurality of conductive keycaps disposed above the flexible insulation pad, each conductive keycap corresponding to one of the through holes; and
      a plurality of conductive contact parts, each conductive contact part being connected to one of the conductive keycaps, each conductive contact part and the capacitive touch surface forming a gap therebetween, wherein each conductive keycap is capable of being pressed such that the corresponding conductive contact part contacts the corresponding touch position through the corresponding through hole.

2. The portable electronic apparatus of claim 1, wherein the keypad comprises a plurality of elastic members disposed on the flexible insulation pad, each elastic member corresponds to one of the through holes, each conductive keycap is disposed on the corresponding elastic member, and each conductive keycap is capable of being pressed such that the corresponding elastic member deforms elastically.

3. The portable electronic apparatus of claim 2, wherein the elastic members are conductive, and each conductive contact part is connected to the corresponding conductive keycap through the corresponding elastic member.

4. The portable electronic apparatus of claim 3, wherein the elastic members are conductive, and each elastic member and the corresponding conductive contact part are formed in one piece.

5. The portable electronic apparatus of claim 4, wherein the keypad comprises a conductive rubber pad disposed on the flexible insulation pad, and the conductive rubber pad, the elastic members, and the conductive contact parts are formed in one piece.

6. The portable electronic apparatus of claim 5, wherein each conductive keycap comprises a plurality of protrusions protruding toward the flexible insulation pad.

7. The portable electronic apparatus of claim 2, wherein the flexible insulation pad and the elastic members are formed in one piece.

8. The portable electronic apparatus of claim 7, wherein each conductive contact part and the corresponding conductive keycap are formed in one piece.

9. The portable electronic apparatus of claim 1, wherein the panel is a touch display panel, and the processing module controls the touch display panel to display a keyboard image corresponding to the virtual keyboard interface.

10. The portable electronic apparatus of claim 1, the touch positions comprising a first touch position, a second touch position, and a third touch position, which are noncollinear, the conductive keycaps correspondingly comprising a first conductive keycap, a second conductive keycap, and a third conductive keycap, wherein the processing module, according to touches on the capacitive touch surface corresponding to the first conductive keycap, the second conductive keycap, and the third conductive keycap by the panel, correspondingly determines a first reference position, a second reference position, and a third reference position, and then the processing module generates the virtual keyboard interface such that the first touch position, the second touch position, and the third touch position correspond to the first reference position, the second reference position, and the third reference position respectively.

11. A key pad, used for a portable electronic apparatus, the portable electronic apparatus comprising a panel having a capacitive touch surface, the portable electronic apparatus providing a virtual keyboard interface on the capacitive touch surface, the virtual keyboard interface having a plurality of touch positions, the key pad being capable of being placed on the capacitive touch surface corresponding to the virtual keyboard interface, the key pad comprising:
- a flexible insulation pad disposed on the capacitive touch surface, the flexible insulation pad having a plurality of through holes, each through hole corresponding to one of the touch positions;
- a plurality of conductive keycaps disposed above the flexible insulation pad, each conductive keycap corresponding to one of the through holes; and
- a plurality of conductive contact parts, each conductive contact part being connected to one of the conductive keycaps, each conductive contact part and the capacitive touch surface forming a gap therebetween, wherein each conductive keycap is capable of being pressed such that the corresponding conductive contact part contacts the corresponding touch position through the corresponding through hole.

12. The key pad of claim 11, wherein the key pad comprises a plurality of elastic members disposed on the flexible insulation pad, each elastic member corresponds to one of the through holes, each conductive keycap is disposed on the corresponding elastic member, and each conductive keycap is capable of being pressed such that the corresponding elastic member deforms elastically.

13. The key pad of claim 12, wherein the elastic members are conductive, and each conductive contact part is connected to the corresponding conductive keycap through the corresponding elastic member.

14. The key pad of claim 13, wherein the elastic members are conductive, and each elastic member and the corresponding conductive contact part are formed in one piece.

15. The key pad of claim 14, further comprising a conductive rubber pad disposed on the flexible insulation pad, wherein the conductive rubber pad, the elastic members, and the conductive contact parts are formed in one piece.

16. The keypad of claim 15, wherein each conductive keycap comprises a plurality of protrusions protruding toward the flexible insulation pad.

17. The key pad of claim 12, wherein the flexible insulation pad and the elastic members are formed in one piece.

18. The keypad of claim 17, wherein each conductive contact part and the corresponding conductive keycap are formed in one piece.

* * * * *